US011091138B2

(12) United States Patent
Zimmermann et al.

(10) Patent No.: US 11,091,138 B2
(45) Date of Patent: Aug. 17, 2021

(54) BRAKE SYSTEM FOR MOTOR VEHICLES AND METHOD FOR OPERATING A BRAKE SYSTEM

(71) Applicant: Continental Teves AG & Co. oHG, Frankfurt am Main (DE)

(72) Inventors: Jochen Zimmermann, Oberwallmenach (DE); Robert Grimm, Hofheim (DE); Martin Baechle, Kelkheim (DE)

(73) Assignee: Continental Teves AG & Co. OHG

( * ) Notice: Subject to any disclaimer, the term of this patent is extended or adjusted under 35 U.S.C. 154(b) by 55 days.

(21) Appl. No.: 16/476,655

(22) PCT Filed: Dec. 20, 2017

(86) PCT No.: PCT/EP2017/083843
§ 371 (c)(1),
(2) Date: Jul. 9, 2019

(87) PCT Pub. No.: WO2018/130393
PCT Pub. Date: Jul. 19, 2018

(65) Prior Publication Data
US 2020/0406880 A1      Dec. 31, 2020

(30) Foreign Application Priority Data

Jan. 11, 2017   (DE) .................... 10 2017 200 342.1
Nov. 6, 2017    (DE) .................... 10 2017 219 598.3

(51) Int. Cl.
*B60T 13/68*       (2006.01)
*B60T 8/40*        (2006.01)
(Continued)

(52) U.S. Cl.
CPC .......... *B60T 13/686* (2013.01); *B60T 8/4081* (2013.01); *B60T 7/042* (2013.01); *B60T 11/32* (2013.01);
(Continued)

(58) Field of Classification Search
CPC ...... B60T 8/4081; B60T 11/32; B60T 11/323; B60T 13/165; B60T 13/166; B60T 17/226
See application file for complete search history.

(56) References Cited

U.S. PATENT DOCUMENTS 4,736,992 A * 4/1988 Hendrickson ........... B60T 8/885
                                                    303/122.1
5,951,120 A * 9/1999 Shimura ................. B60T 8/326
                                                    303/113.1
(Continued)

FOREIGN PATENT DOCUMENTS

CN      204309768 U     5/2015
CN      105745126 A     7/2016
(Continued)

OTHER PUBLICATIONS

International Search Report and Written Opinion for International Application No. PCT/EP2017/083843, dated May 11, 2018—9 pages.
(Continued)

*Primary Examiner* — Thomas J Williams
(74) *Attorney, Agent, or Firm* — RatnerPrestia

(57) ABSTRACT

A motor vehicle brake system having at least four hydraulically actuatable wheel brakes, including an electrically actuatable inlet valve for each wheel brake. A master brake cylinder actuable by a brake pedal is separably hydraulically connected via an isolation valve to a brake supply line to which the inlet valves are connected, and an electrically controllable pressure-providing device having a pressure
(Continued)

space hydraulically connected to the brake supply line. An electrically actuatable circuit isolation valve inline with the brake supply line. With the circuit isolation valve closed the brake supply line is hydraulically separated into first and second line sections. The first line section connected to two of the inlet valves, and the second line section connected to the remaining inlet valves. The pressure space is hydraulically connected to the second line section. The circuit isolation valve is normally open, wherein the pressure chamber of the master brake cylinder is connected to the first line section via the isolation valve.

18 Claims, 4 Drawing Sheets

(51) Int. Cl.
    *B60T 11/32*    (2006.01)
    *B60T 13/16*    (2006.01)
    *B60T 17/22*    (2006.01)
    *B60T 7/04*    (2006.01)
(52) U.S. Cl.
    CPC ........... *B60T 13/165* (2013.01); *B60T 17/226* (2013.01); *B60Y 2400/81* (2013.01)

(56) References Cited

U.S. PATENT DOCUMENTS

| | | | | |
|---|---|---|---|---|
| 5,979,997 | A * | 11/1999 | Ohkubo | B60T 8/3255 303/116.1 |
| 6,123,397 | A * | 9/2000 | Ohtomo | B60T 8/4072 303/116.1 |
| 6,158,825 | A * | 12/2000 | Schunck | B60T 7/042 303/115.4 |
| 6,517,170 | B1 * | 2/2003 | Hofsaess | B60T 8/88 303/11 |
| 7,461,906 | B2 | 12/2008 | Baechle et al. | |
| 8,888,197 | B2 * | 11/2014 | Miyazaki | B60T 13/168 303/9.61 |
| 9,315,180 | B2 | 4/2016 | Jungbecker et al. | |
| 9,475,475 | B2 * | 10/2016 | Nakata | B60T 8/4072 |
| 9,834,188 | B2 | 12/2017 | Feigel | |
| 2007/0108836 | A1 | 5/2007 | Feigel | |
| 2014/0354036 | A1 * | 12/2014 | Koo | B60T 13/745 303/6.01 |
| 2015/0108829 | A1 * | 4/2015 | Miyazaki | B60T 13/146 303/10 |
| 2019/0344769 | A1 * | 11/2019 | Zimmermann | B60T 13/745 |
| 2020/0406880 | A1 * | 12/2020 | Zimmermann | B60T 17/22 |
| 2021/0053540 | A1 * | 2/2021 | Besier | B60T 8/326 |

FOREIGN PATENT DOCUMENTS

| | | | | |
|---|---|---|---|---|
| DE | 10235288 | A1 | 4/2003 | |
| DE | 102008002420 | A1 | 12/2009 | |
| DE | 102011082492 | A1 | 3/2013 | |
| DE | 102012217825 | A1 | 4/2014 | |
| DE | 102012219390 | A1 | 4/2014 | |
| DE | 102013217954 | A1 | 3/2015 | |
| DE | 102014217428 | A1 | 3/2016 | |
| DE | 102018212905 | A1 * | 2/2020 | ............ B60T 8/4081 |
| FR | 2655933 | A1 | 6/1991 | |
| GB | 2158901 | A | 11/1985 | |
| WO | 2004016489 | A1 | 2/2004 | |
| WO | 2005014352 | A1 | 2/2005 | |
| WO | 2011029812 | A1 | 3/2011 | |
| WO | 2014048600 | A1 | 4/2014 | |
| WO | 2015104122 | A1 | 7/2015 | |

OTHER PUBLICATIONS

English Translation of the Written Opinion for International Application No. PCT/EP2017/083843, dated May 11, 2018—7 pages.
Chinese Office Action for Chinese Application No. 201780082995.2, dated Nov. 25, 2020 with partial translation, 6 pages.
Korean Decision for Grant of Patent for Korean Application No. 10-2019-7022634, dated Feb. 20, 2021, with translation, 3 pages.

* cited by examiner

BRAKE SYSTEM FOR MOTOR VEHICLES AND METHOD FOR OPERATING A BRAKE SYSTEM

CROSS REFERENCE TO RELATED APPLICATIONS

This application is the U.S. National Phase Application of PCT International Application No. PCT/EP2017/083843, filed, Dec. 20, 2017, which claims priority to German Patent Application No. 10 2017 219 598.3, filed Nov. 6, 2017 and German Patent Application No. 10 2017 200 342.1, filed Jan. 11, 2017 the contents of such applications being incorporated by reference herein.

FIELD OF THE INVENTION

The invention relates to a brake system for a motor vehicle and to a method for operating a brake system.

BACKGROUND OF THE INVENTION

WO 2011/029812 A1, which is incorporated herein by reference, discloses a brake system having a brake pedal-actuatable tandem master brake cylinder, a travel simulator and an electrically controllable pressure-providing device. The four wheel brakes of the brake system are arranged in two brake circuits, wherein each brake circuit is connected to one of the two pressure spaces of the two-circuit master brake cylinder. In order to realize a "brake-by-wire" operating mode and a fallback operating mode, it is necessary to provide two isolation valves and two sequence valves to disconnect the wheel brakes from the master brake cylinder and the pressure-providing device.

WO 2005/014352 A1, which is incorporated herein by reference, discloses a brake system having a brake pedal-actuatable, single-circuit master brake cylinder and an electrically controllable pressure-providing device in the form of a pump. The brake system is of single-circuit design. The pressure chamber of the master brake cylinder is connected to all of the wheel brakes via a first common line and an isolation valve for each wheel brake. Furthermore, the pump is connected to all of the wheel brakes via a second common line and an inlet valve for each wheel brake. A pressure reduction is possible by means of an outlet valve for each wheel brake. A separation into two brake circuits is not possible, which is disadvantageous in the event of a leakage and reduces the availability or the operational reliability of the brake system.

DE 10 2014 217 428 A1, which is incorporated herein by reference, describes a brake system of the type in question having a brake pedal-actuatable master brake cylinder, an electrically controllable pressure-providing device in the form of a pump and a circuit isolation valve. The brake system comprises a first brake circuit having two wheel brakes and a second brake circuit having two wheel brakes. The two brake circuits are separated from one another by the normally closed circuit isolation valve. Each of the brake circuits is connected to one of the two pressure spaces of the two-circuit master brake cylinder via a respective isolation valve. The delivery side of the pump is hydraulically connected directly to the first brake circuit. As required, it is possible, by opening the circuit isolation valve, for brake fluid to be simultaneously pumped by means of the pump into the first and the second brake circuit. To save on a pedal travel simulator, the first pressure space of the master brake cylinder can be connected to the pressure medium reservoir via a simulator valve.

SUMMARY OF THE INVENTION

An aspect of the present invention aims to provide an alternative, compact and cost-effective brake system for a "brake-by-wire" operating mode and a fallback operating mode that offers a high function range and a high availability of the brake system, in particular in the event of a leakage. It is furthermore intended to provide a method for operating a brake system that offers a high availability of the brake system, in particular in the event of a leakage.

The idea on which an aspect of the invention is based is that, in a brake system which comprises a brake pedal-actuatable master brake cylinder, an electrically controllable pressure-providing device having a pressure space, wheel-specific inlet valves and a brake supply line to which the inlet valves are connected, which brake supply line is connected to the master brake cylinder and the pressure-providing device and in which there is arranged an electrically actuatable circuit isolation valve for separating the brake supply line into a first line section for two of the wheel brakes and a second line section for the remaining wheel brakes, the master brake cylinder is to be configured with a single-circuit design having only one pressure chamber, and the circuit isolation valve is to be configured with a normally open design. Here, the pressure chamber of the master brake cylinder is connected to the first line section via an isolation valve, and the pressure space of the pressure-providing device is connected to the second line section.

Thus, the brake system is of single-circuit design in the de-energized case, but it is possible, as required, to switch over to a two-circuit configuration in which each circuit can be charged with pressure by means of one of the two pressure sources.

The circuit isolation valve is thus arranged in such a way that, upon a closing of the circuit isolation valve, the wheel brakes are hydraulically separated into two groups or two hydraulic brake circuits, wherein each group or each brake circuit comprises at least two wheel brakes. Each group is preferably assigned the wheel brakes of one of the vehicle axles.

With the circuit isolation valve closed, upon an actuation of the pressure-providing device, only the inlet valves connected to the second line section are thus supplied with pressure (from the pressure-providing device), and, upon an actuation of the master brake cylinder, only the inlet valves connected to the first line section are supplied with pressure (from the master brake cylinder).

An aspect of the invention offers the advantage that the master brake cylinder can be connected via a single isolation valve to the brake supply line and thus to the inlet valves or to the wheel brakes. In addition, the pressure-providing device can also be connected via a single sequence valve to the brake supply line and thus to the inlet valves or to the wheel brakes. However, the circuit isolation valve allows, as required, a pressure medium separation into two brake circuits to be carried out, this having been implemented in the case of known brake systems by the floating piston of the tandem master brake cylinder. A further advantage of an aspect of the invention lies in the fact that the circuit separation can be carried out without simultaneously having to put the pressure-providing device out of operation.

The pressure space of the pressure-providing device is preferably separably connected to the brake supply line via a sequence valve in order, in the event of a leakage in the pressure-providing device, to be able to hydraulically isolate the latter from the remainder of the brake system. With particular preference, the pressure space is connected to the brake supply line via only one sequence valve. The sequence valve is advantageously electrically actuatable.

With preference, the inlet valves connected to the first line section are assigned to the wheels of the first vehicle axle, and the inlet valves connected to the second line section are assigned to the wheels of the second vehicle axle.

With preference, the first hydraulic brake circuit comprises the master brake cylinder and the inlet valves of the wheel brakes of the first vehicle axle, advantageously of the front axle, and the hydraulic second brake circuit comprises the pressure-providing device and the inlet valves of the wheel brakes of the second vehicle axle, advantageously of the rear axle. Thus, in the case of the circuit separation, a complete antilocking control (ABS) can still be carried out on the rear axle by means of the pressure-providing device, and an electronic brake force distribution (between the axles) (EBD) can be carried out.

For pressure regulation, a (wheel) pressure sensor is preferably provided for each line section, which sensor detects the pressure behind one of the inlet valves assigned to the line section.

Alternatively, preferably a, in particular only one, pressure sensor which detects the pressure of the pressure-providing device is provided for pressure regulation. This pressure sensor can be arranged in front of or behind the sequence valve.

In addition, a pressure sensor which detects the pressure of the master brake cylinder is preferably provided.

With preference, the isolation valve is of normally open design and the sequence valve is of normally closed design, with the result that, in the event of a complete power failure, all of the wheel brakes can be supplied with pressure by means of the master brake cylinder and an outflow of pressure medium via the pressure-providing device is securely prevented.

The brake system preferably comprises a pressure medium reservoir which is under atmospheric pressure and whose pressure medium level is detected by means of a measuring device. Thus, a leakage can be detected in a simple manner on the basis of a drop in the pressure medium level.

The circuit isolation valve is preferably closed in dependence on the detected pressure medium level. If the detected pressure medium level falls below a predetermined threshold value, a circuit separation is particularly preferably carried out by closing the circuit isolation valve.

The master brake cylinder is of single-circuit design, wherein the pressure chamber of the master brake cylinder is preferably connected to the brake supply line via a first feed line having only one isolation valve. A further hydraulic connection between master brake cylinder and brake supply line is not provided.

According to a preferred embodiment of the brake system according to an aspect of the invention, the pressure chamber of the master brake cylinder is connected to the pressure medium reservoir via a hydraulic connection, wherein no electrically actuatable valve is arranged in the hydraulic connection.

Alternatively, it is preferable that the pressure chamber of the master brake cylinder is connected to the pressure medium reservoir via a hydraulic connection in which an electrically actuatable diagnostic valve is arranged.

In both cases, the hydraulic connection between pressure chamber and pressure medium reservoir can be disconnected by an actuation/displacement of the master brake cylinder piston.

The electrically controllable pressure-providing device is preferably of single-circuit design. The pressure-providing device is preferably formed by a cylinder-piston arrangement having only one hydraulic pressure space, the piston of which can be actuated by an electromechanical actuator. Thus, a precise and rapid pressure setting is possible.

Here, the single pressure space of the pressure-providing device is particularly preferably connected to the brake supply line via a second feed line having only one sequence valve. A further hydraulic connection between pressure-providing device and brake supply line is not provided.

Thus, only two valves (one isolation valve and one sequence valve) are necessary for separating the wheel brakes from the single-circuit master brake cylinder and the single-circuit pressure-providing device in order to realize a "brake-by-wire" operating mode or a fallback operating mode.

The brake system preferably comprises for each wheel brake an electrically actuatable outlet valve which connects the assigned wheel brake to the pressure medium reservoir.

The outlet valves are preferably connected to the pressure medium reservoir via a common hydraulic connection.

The brake system preferably comprises a simulation device which imparts a pleasant brake pedal feel to the vehicle driver in a "brake-by-wire" operating mode and whose action can be deactivated in a fallback operating mode, wherein the simulation device comprises an elastic element and is hydraulically connected to the pressure chamber of the master brake cylinder.

The simulation device is preferably designed such that it can be activated and deactivated by means of a simulator enable valve. The simulator enable valve is particularly preferably arranged in the hydraulic connection between the simulation device and the master brake cylinder.

The first hydraulic brake circuit preferably further comprises the simulation device.

The first hydraulic brake circuit preferably further comprises the isolation valve.

The second hydraulic brake circuit preferably further comprises the sequence valve.

According to one development of an aspect of the invention, the master brake cylinder, the pressure-providing device, the brake supply line and the valves, and also possibly the simulation device with simulator enable valve, are jointly arranged in a single electrohydraulic module or a single hydraulic control and regulating unit.

According to another development of an aspect of the invention, the master brake cylinder is arranged in a first electrohydraulic module or a first hydraulic control and regulating unit, whereas the pressure-providing device, the brake supply line and the valves are arranged in a separate, second electrohydraulic module or a second hydraulic control and regulating unit. The possibly present simulation device with simulator enable valve can be arranged in the first electrohydraulic module or the first hydraulic control and regulating unit or in the second electrohydraulic module or the second hydraulic control and regulating unit.

According to a further development of an aspect of the invention, the master brake cylinder, the pressure-providing device, the isolation valve and the circuit isolation valve, and possibly the sequence valve and/or the simulation device with simulator enable valve, are arranged in a first electrohydraulic module or a first hydraulic control and regulating unit, whereas the inlet valves, and possibly the outlet valves and/or the wheel pressure sensors, are arranged in a separate, second electrohydraulic module or a second hydraulic control and regulating unit.

The brake system is preferably a brake system for motor vehicles which can be activated in a "brake-by-wire" operating mode both by the vehicle driver and independently of the vehicle driver, and is preferably operated in the "brake-by-wire" operating mode, and can be operated in at least one fallback operating mode in which only operation by the vehicle driver is possible.

The brake system preferably comprises for each wheel brake an inlet valve and an outlet valve for setting wheel-specific brake pressures. The wheel-specific brake pressures are derived from the brake supply pressure in the brake supply line. In the nonactivated state, the inlet valves particularly preferably allow the brake circuit supply pressure to be passed on to the wheel brakes, and the outlet valves block an outflow of pressure medium from the wheel brakes.

According to another preferred embodiment of the brake system according to an aspect of the invention, the latter comprises for each wheel brake only one inlet valve for setting wheel-specific brake pressures which are derived from the brake circuit supply pressure in the brake supply line. The brake system is then operated by means of the pressure-providing device in a so-called multiplex method.

According to a preferred embodiment of the brake system according to an aspect of the invention, the brake system comprises an electric parking brake (EPB) on each of the wheels of the rear axle. Said parking brake can be integrated into the hydraulic wheel brakes, being a so-called integrated electric parking brake (IPB).

An aspect of the invention offers the advantage that the single-circuit master brake cylinder is simpler and more cost-effective. Furthermore, it is advantageous that the master brake cylinder is shorter than a tandem master brake cylinder, with the result that the installation length of the brake assembly in the vehicle longitudinal direction can be reduced. The brake system further offers the advantage that, in the fault-free case of the brake system, without switching the circuit isolation valve, a pressure buildup can be carried out on all the wheel brakes by means of the pressure-providing device. Nevertheless, a circuit separation is possible by closing the circuit isolation valve, with the result that the one brake circuit can continue to be charged with pressure by means of the pressure-providing device, whereas the other brake circuit can be charged with pressure by the master brake cylinder. Moreover, the circuit separation can be controlled in a simple situation-dependent manner.

An aspect of the invention also relates to a method for operating a brake system, in which the circuit isolation valve is open in a fault-free state of the brake system and is closed upon a suspicion of a leakage or a determination of a leakage in the brake system.

An aspect of the invention also relates to a method for operating a brake system having at least four hydraulically actuatable wheel brakes for wheels, which are distributed among a first vehicle axle and a second vehicle axle, at least one electrically actuatable inlet valve for each wheel brake for the purpose of setting wheel-specific brake pressures, a master brake cylinder which can be actuated by means of a brake pedal and which has a pressure chamber, wherein the pressure chamber is separably hydraulically connected via an isolation valve to a brake supply line to which the wheel brakes are connected, and an electrically controllable pressure-providing device having a pressure space, wherein the pressure space is hydraulically connected to the brake supply line, wherein an electrically actuatable circuit isolation valve is arranged in the brake supply line in such a way that, with the circuit isolation valve closed, the brake supply line is hydraulically separated into a first line section and a second line section, wherein the first line section is connected to two of the wheel brakes, and the second line section is connected to the other wheel brakes. Here, the circuit isolation valve is open in a fault-free state of the brake system, and the circuit isolation valve is closed upon a suspicion of a leakage in the brake system or a determination of a leakage in the brake system.

The master brake cylinder is preferably of single-circuit design, with only one pressure chamber.

The pressure chamber is preferably connected to the brake supply line via exactly one isolation valve. A second hydraulic connection between pressure chamber and brake supply line is not present.

The isolation valve is preferably electrically actuatable.

The pressure space of the pressure-providing device is preferably separably connected to the brake supply line via a sequence valve. The sequence valve is particularly preferably electrically actuatable.

The pressure-providing device is preferably also of single-circuit design, with only one pressure space.

The pressure space is preferably connected to the brake supply line via exactly one sequence valve. A second hydraulic connection between pressure space and brake supply line is not present.

In the method according to an aspect of the invention, the circuit isolation valve is preferably closed in dependence on a pressure medium level of a pressure medium reservoir, since a relevant leakage can be directly recognized on the basis of the pressure medium level of the pressure medium reservoir.

To monitor the brake system for a leakage, the signal of a measuring device which detects a pressure medium level of a pressure medium reservoir which is under atmospheric pressure is preferably evaluated.

To operate the brake system, the wheel brakes assigned to the second line section are preferably actuated, with the circuit isolation valve closed, by means of the pressure-providing device in that pressure medium is displaced from the pressure-providing device via the second line section to said wheel brakes. With particular preference, with the circuit isolation valve closed, only the wheel brakes assigned to the second line section are actuated by means of the pressure-providing device, and the wheel brakes assigned to the first line section are not actuated by means of the pressure-providing device. This is very particularly preferred by virtue of the fact that the pressure-providing device is of single-circuit design and is exclusively connected to the second line section.

With the circuit isolation valve closed, the wheel brakes of the second vehicle axle are preferably actuated by means of the pressure-providing device. With particular preference, with the circuit isolation valve closed, only the wheel brakes of the second vehicle axle are actuated by means of the pressure-providing device, and the wheel brakes of the first vehicle axle are not actuated by means of the pressure-providing device. This is very particularly preferred by virtue of the fact that the pressure-providing device is of single-circuit design and is exclusively connected to the second line section to which the wheel brakes of the second vehicle axle are connected.

With the circuit isolation valve closed, the wheel brakes assigned to the first line section are preferably actuated by means of the master brake cylinder in that pressure medium is displaced by the driver from the master brake cylinder via the first line section to said wheel brakes. With particular preference, with the circuit isolation valve closed, only the wheel brakes assigned to the first line section are actuated by means of the master brake cylinder, and the wheel brakes assigned to the second line section are not actuated by means of the master brake cylinder. This is very particularly preferred by virtue of the fact that the master brake cylinder is of single-circuit design and is exclusively connected to the first line section.

With the circuit isolation valve closed, the wheel brakes of the first vehicle axle are preferably actuated by means of the master brake cylinder. With particular preference, with the circuit isolation valve closed, only the wheel brakes of the first vehicle axle are actuated by means of the master brake cylinder, and the wheel brakes of the second vehicle axle are not actuated by means of the master brake cylinder. This is very particularly preferred by virtue of the fact that the master brake cylinder is of single-circuit design and is exclusively connected to the first line section to which the wheel brakes of the first vehicle axle are connected.

The first vehicle axle is preferably the front axle and the second vehicle axle is preferably the rear axle. It is advantageous to implement the circuit separation in such a way that, with the circuit isolation valve closed, the master brake cylinder can actuate the wheel brakes of the front axle, and the pressure-providing device can actuate the wheel brakes of the rear axle since in this way a complete antilocking control (ABS) can still be carried out on the rear axle and an electronic brake force distribution (between the axles) (EBD) can be carried out. This additionally affords a design advantage for the master brake cylinder or for the hydraulic fallback level, for example after a power failure. There can thus be implemented a design for a deceleration of about 4 m/s$^2$ in order, in the case of all fault patterns, in particular wheel leakages, at least to ensure the legally required residual braking action of 2.44 m/s$^2$.

An aspect of the invention offers the advantage of improved availability or operational reliability of the brake system. By virtue of the fact that, in principle, a single-circuit brake system is used and, in the event of a leakage or a suspicion of a leakage, there is an electrically controlled switchover (by means of the circuit isolation valve) to a two-circuit configuration of the brake system, the availability of the brake system is increased.

BRIEF DESCRIPTION OF THE DRAWINGS

Further preferred embodiments of aspects of the invention will emerge from the dependent claims and the following description with reference to figures, in which FIG. 1 schematically shows a first exemplary embodiment of a brake system according to an aspect of the invention, FIG. 2 schematically shows a second exemplary embodiment of a brake system according to an aspect of the invention, FIG. 3 schematically shows a third exemplary embodiment of a brake system according to an aspect of the invention, and FIG. 4 schematically shows a fourth exemplary embodiment of a brake system according to an aspect of the invention.

DETAILED DESCRIPTION OF THE PREFERRED EMBODIMENTS

Figure 1:
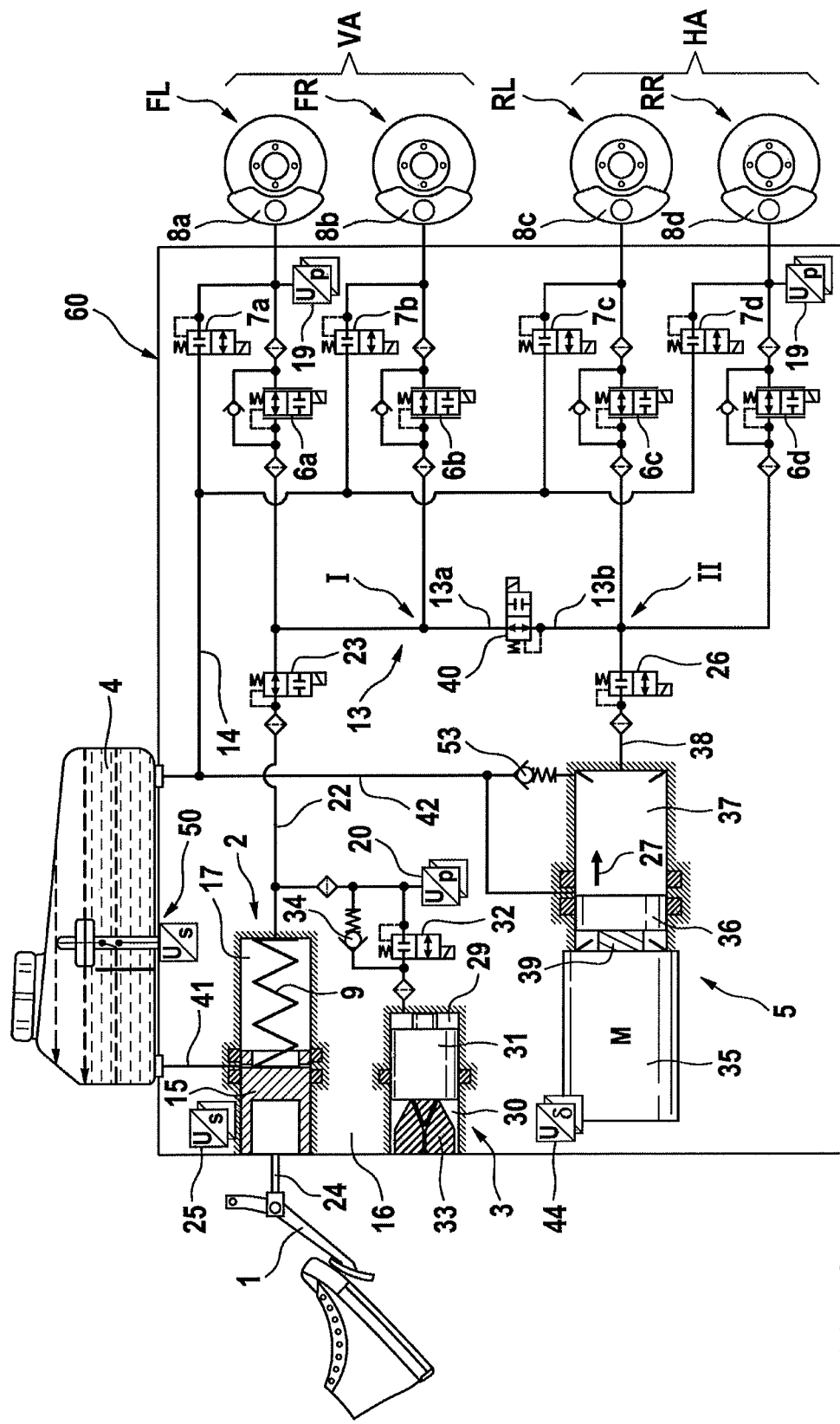

FIG. 1 schematically illustrates a first exemplary embodiment of a brake system according to an aspect of the invention for a motor vehicle brake system having four hydraulically actuatable wheel brakes 8*a*-8*d*. The brake system comprises a master brake cylinder 2 which can be actuated by means of an actuating or brake pedal 1, a travel simulator or a simulation device 3 which interacts with the master brake cylinder 2, a pressure medium reservoir 4 which is under atmospheric pressure, an electrically controllable pressure-providing device 5, and wheel-specific brake pressure modulation valves which are configured according to the example as inlet valves 6*a*-6*d* and outlet valves 7*a*-7*d*. The brake system further comprises an electronic control and regulating unit 12 for activating the electrically actuatable components of the brake system, said unit not being illustrated in FIG. 1.

According to the example, the wheel brake 8*a* is assigned to the left front wheel (FL), the wheel brake 8*b* is assigned to the right front wheel (FR), the wheel brake 8*c* is assigned to the left rear wheel (RL), and the wheel brake 8*d* is assigned to the right rear wheel (RR).

The master brake cylinder 2 has, in a housing 16, a master brake cylinder piston 15, which delimits a hydraulic pressure chamber 17, and constitutes a single-circuit master brake cylinder. The pressure chamber 17 receives a restoring spring 9 which, with the master brake cylinder 2 unactuated, positions the piston 15 in a starting position. On the one hand, the pressure chamber 17 is connected to the pressure medium reservoir 4 via radial bores formed in the piston 15 and a corresponding pressure equalization line 41, wherein this connection can be shut off by a relative movement of the piston 17 in the housing 16. On the other hand, the pressure chamber 17 is connected by means of a hydraulic line section (also referred to as first feed line) 22 to a brake supply line 13 to which the inlet ports of the inlet valves 6*a*-6*d* are connected. The pressure chamber 17 of the master brake cylinder 2 is thus connected to all of the inlet valves 6*a*-6*d*.

According to the example, no valve, in particular no electrically or hydraulically actuatable valve and no nonreturn valve, is arranged in the pressure equalization line 41 or in the connection between the pressure chamber 17 and the pressure medium reservoir 4.

Alternatively, a, in particular normally open, diagnostic valve, preferably a connection in parallel of a normally open diagnostic valve with a nonreturn valve which closes in the direction of the pressure medium reservoir 4, can be contained in the pressure equalization line 41 or between the master brake cylinder 2 and the pressure medium reservoir 4.

An isolation valve 23 is arranged between the feed line 22 connected to the pressure chamber 17 and the brake supply line 13, or the pressure chamber 17 is connected to the brake supply line 13 via the first feed line 22 having an isolation valve 23. The isolation valve 23 is designed as an electrically actuatable, preferably normally open (NO), 2/2-way valve. The isolation valve 23 allows the hydraulic connection between the pressure chamber 17 and the brake supply line 13 to be shut off.

A piston rod 24 couples the pivoting movement of the brake pedal 1 resulting from a pedal actuation to the translational movement of the master brake cylinder piston 15, the actuation travel of which is detected by a travel sensor 25, which is preferably of redundant design. In this way, the corresponding piston travel signal is a measure of the brake pedal actuation angle. It represents a braking demand of a vehicle driver.

A pressure sensor 20 connected to the first feed line 22 detects the pressure built up in the pressure chamber 17 as a result of a displacement of the piston 15. This pressure value can also be evaluated to characterize or determine the braking demand of the vehicle driver. As an alternative to a pressure sensor 20, use can also be made of a force sensor 20 for determining the braking demand of the vehicle driver.

According to the example, the simulation device 3 is of hydraulic design and coupled hydraulically to the master brake cylinder 2. The simulation device 3 has, for example, essentially a simulator chamber 29, a simulator rear chamber 30 and a simulator piston 31 which separates the two chambers 29, 30 from one another. The simulator piston 31 is supported on a housing by an elastic element 33 (for example simulator spring) which is arranged in the simulator rear chamber 30 (which is dry according to the example). According to the example, the hydraulic simulator chamber 29 is connected to the pressure chamber 17 of the master brake cylinder 2 by means of a preferably electrically actuatable, preferably normally closed simulator enable valve 32. A nonreturn valve 34 arranged hydraulically antiparallel with respect to the simulator enable valve 32 allows the pressure medium to flow back from the simulator chamber 29 to the master brake cylinder pressure chamber 17 substantially unhindered, irrespective of the switching state of the simulator enable valve 32.

As already mentioned, the brake system comprises, for each hydraulically actuatable wheel brakes 8a-8d, an inlet valve 6a-6d and an outlet valve 7a-7d which are hydraulically interconnected in pairs via central ports and are connected to the wheel brakes 8a-8d. Connected in parallel with each of the inlet valves 6a-6d is a nonreturn valve (not designated specifically) which opens in the direction of the brake supply line 13. The outlet ports of the outlet valves 7a-7d are connected to the pressure medium reservoir 4 via a common return line 14.

The electrically controllable pressure-providing device 5 is designed as a hydraulic cylinder-piston arrangement (or a single-circuit electrohydraulic actuator (linear actuator)), the piston 36 of which can be actuated by a schematically indicated electric motor 35 via a likewise schematically illustrated rotation/translation mechanism 39. The piston 36 delimits the single pressure space 37 of the pressure-providing device 5.

A merely schematically indicated rotor position sensor which serves to detect the rotor position of the electric motor 35 is denoted by reference sign 44.

A line section (also referred to as second feed line) 38 is connected to the pressure space 37 of the electrically controllable pressure-providing device 5. The feed line 38 is connected to the brake supply line 13 via an electrically actuatable, preferably normally closed, sequence valve 26. The sequence valve 26 allows the hydraulic connection between the pressure space 37 of the electrically controllable pressure-providing device 5 and the brake supply line 13 (and thus the inlet ports of the inlet valves 6a-6d) to be opened and shut off in a controlled manner.

The actuator pressure produced by the action of force of the piston 36 on the pressure medium enclosed in the pressure space 37 is fed into the second feed line 38. In a "brake-by-wire" operating mode, in particular in a fault-free state of the brake system, the feed line 38 is connected to the brake supply line 13 via the sequence valve 26. In this way there occurs, during normal braking, a wheel brake pressure buildup and pressure reduction for all the wheel brakes 8a-8d as a result of the forward and backward movement of the piston 36.

In the case of a pressure reduction by backward movement of the piston 36, the pressure medium previously displaced from the pressure space 37 of the pressure-providing device 5 into the wheel brakes 8a-8d flows back again into the pressure space 37 in the same way.

Alternatively, wheel brake pressures which differ in a wheel-specific manner can be simply set by means of the inlet and outlet valves 6a-6d, 7a-7d. In the case of a corresponding pressure reduction, the pressure medium fraction discharged via the outlet valves 7a-7d flows via the return line 14 into the pressure medium reservoir 4.

Additional pressure medium can be drawn into the pressure space 37 by a backward movement of the piston 36 while the sequence valve 26 is closed, by virtue of the fact that pressure medium can flow out of the reservoir 4 into the actuator pressure space 37 via the line 42 which has a nonreturn valve 53 which opens in a flow direction to the actuator 5.

According to the example, the pressure space 37 is additionally connected, in an unactuated state of the piston 36, to the pressure medium reservoir 4 via one or more snifting holes. This connection between the pressure space 37 and pressure medium reservoir 4 is disconnected upon a (sufficient) actuation of the piston 36 in the actuating direction 27.

In the brake supply line 13 there is arranged an electrically actuatable, normally open circuit isolation valve 40 by means of which the brake supply line 13 can be separated into a first line section 13a, which is connected (via the isolation valve 23) to the master brake cylinder 2, and a second line section 13b, which is connected (via the sequence valve 26) to the pressure-providing device 5. The first line section 13a is connected to the inlet valves 6a, 6b of the wheel brakes 8a, 8b, and the second line section 13b is connected to the inlet valves 6c, 6d of the wheel brakes 8c, 8d. With the circuit isolation valve 40 opened, the brake system is of single-circuit design. By closing the circuit isolation valve 40, the brake system, in particular controlled in a situation-appropriate manner, can be divided or split up into two brake circuits I and II. Here, in the first brake circuit I, the master brake cylinder 2 is connected (via the isolation valve 23) to only the inlet valves 6a, 6b of the wheel brakes 8a, 8b of the front axle VA, and, in the second brake circuit II, the pressure-providing device 5 is connected (with the sequence valve 26 opened) to only the wheel brakes 8c and 8d of the rear axle HA.

With the circuit isolation valve 40 open, the inlet ports of all the inlet valves 6a-6d can be supplied by means of the brake supply line 13 with a pressure which, in a first operating mode (for example "brake-by-wire" operating mode), corresponds to the brake pressure which is provided by the pressure-providing device 5. In a second operating mode (for example in a de-energized fallback operating mode), the brake supply line 13 can be charged with the pressure of the pressure chamber 17 of the master brake cylinder 2.

The brake system comprises a pressure sensor 19 for each brake circuit I or II. Said sensor is preferably arranged in front of one of the wheel brakes of the brake circuit I or II, for example the wheel brake 8a or 8d, for example between inlet valve and wheel brake.

The brake system advantageously comprises a level-measuring device 50 for determining a pressure medium level in the pressure medium reservoir 4. A situation recognition for circuit separation by means of the circuit isolation valve 40 advantageously occurs via the level-measuring device 50.

According to the example, the hydraulic components, namely the master brake cylinder 2, the simulation device 3, the pressure-providing device 5, the valves 6a-6d, 7a-7d, 23, 26, 40 and 32 and also the hydraulic connections including the brake supply line 13, are arranged together in a (single) hydraulic control and regulating unit 60 (HCU). The hydraulic control and regulating unit 60 is assigned the (single) electronic control and regulating unit (ECU) 12. The hydraulic and electronic control and regulation units 60, 12 are preferably designed as one unit (HECU).

Figure 2:
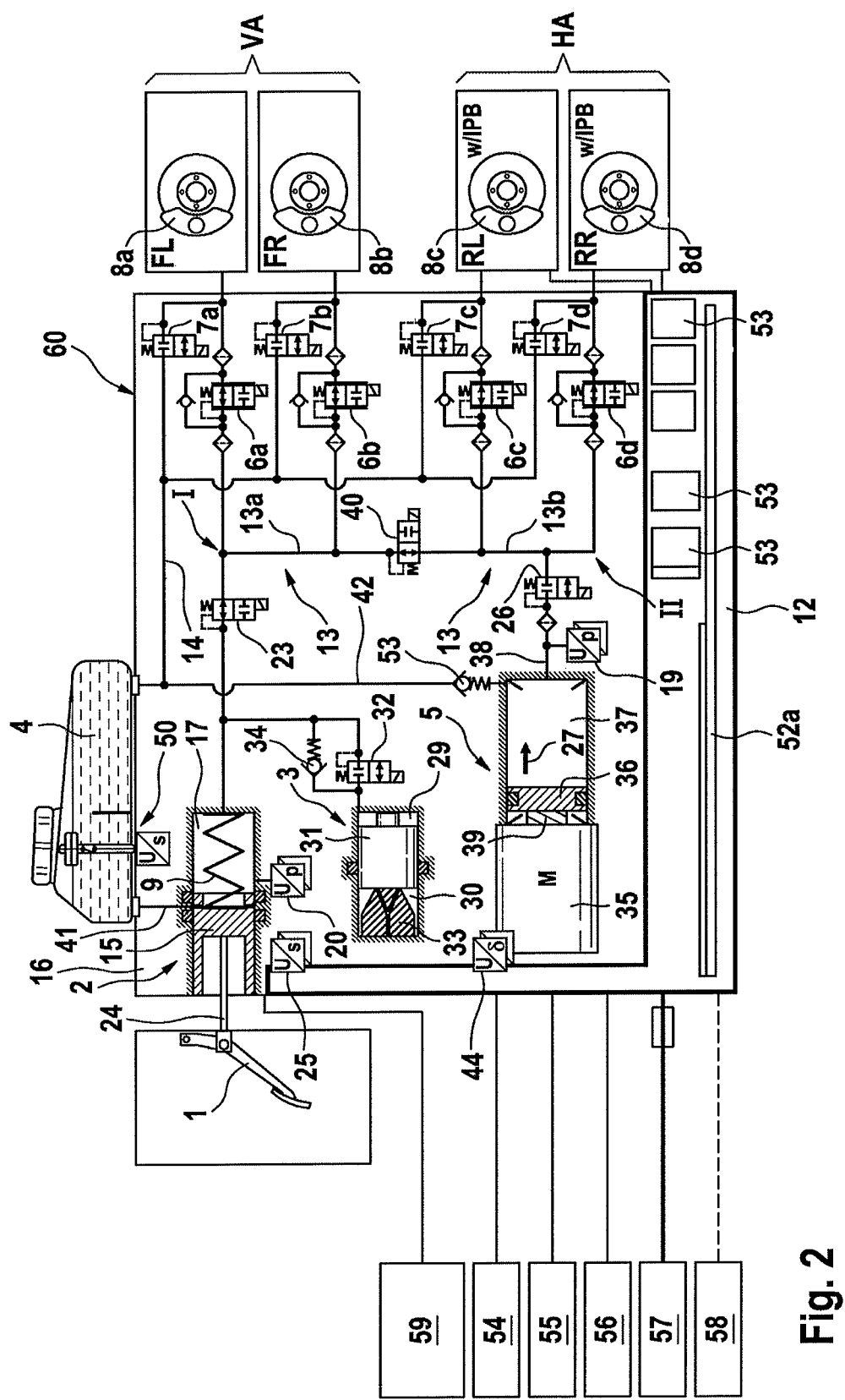

FIG. 2 schematically illustrates a second exemplary embodiment of a brake system according to an aspect of the invention for a motor vehicle. The brake system per se substantially corresponds to the first exemplary embodiment; the differences are explained below. Instead of the two wheel pressure sensors 19 of FIG. 1, there is provided a single pressure sensor 19 which measures the pressure of the pressure-providing device 5. The pressure-providing device 5 has no snifting holes and is connected to the pressure medium reservoir 4 only via the line 42 having the nonreturn valve 53. The brake system additionally has an electric parking brake (IPB) on each of the wheels RL, RR of the rear axle HA.

According to the example, the pressure sensor 19 directly measures the pressure in the pressure space 37 of the pressure-providing device 5. According to the example, the pressure sensor 19 is thus connected directly to the pressure space 37, that is to say arranged hydraulically in front of the sequence valve 26. Alternatively, the pressure sensor 19 can detect the pressure in the second line section 13b of the brake supply line 13, that is to say the pressure sensor 19 can be arranged hydraulically downstream of the sequence valve 26.

The second exemplary embodiment shows further aspects of the brake system which can also be present for a brake system according to the first exemplary embodiment.

The electronic control and regulating unit 12 is illustrated in FIG. 2. According to the example, said unit serves for activating the electrically actuatable components of the brake system, in particular the valves 6a-6d, 7a-7d, 23, 26, 32 and 40 and also the pressure-providing device 5. The signals of the pressure sensor 19 (or of the pressure sensors 19 in the embodiment as in FIG. 1), of the pressure or force sensor 20 for driver demand detection, of the travel or position sensor 25 for the master brake cylinder 2, of the travel or position sensor 44 for the pressure-providing device 5 and of the level-measuring device 50 for the pressure medium reservoir 4 are also preferably fed to the electronic control and regulating unit 12 and/or processed in the electronic control and regulating unit 12.

The electronic control and regulating unit 12 comprises a printed circuit board 52a on which there are provided electrical and electronic components for activating the actuators, such as the valve coils 53 and the electric motor 35, and for evaluating the signals fed to the ECU 12.

The control and regulating unit 12 is supplied by an electrical energy source 57, for example a battery or a vehicle electrical system.

The control and regulating unit 12 is connected to a data bus 58, for example a CAN bus.

The control and regulating unit 12 is preferably connected to one or more of the following components or receives signals thereof:

- a human-machine interface (schematically illustrated by the block 54), for example a switch, for actuation by the driver of the electric parking brakes (IPB, EPB) arranged, according to the example, on the wheels of the rear axle HA,
- wheel-specific wheel rotational speed sensors (schematically illustrated by the block 56),
- an interface (schematically illustrated by the block 55), for example a switch, for activating/deactivating a driving dynamics control function (ESC) or the like or for connecting to/disconnecting from a driving dynamics sensor system.

The unit (HECU) made up of hydraulic and electronic control and regulating unit 60, 12 is preferably mounted on the firewall or the chassis, this being schematically illustrated by the block 59.

Figure 3:
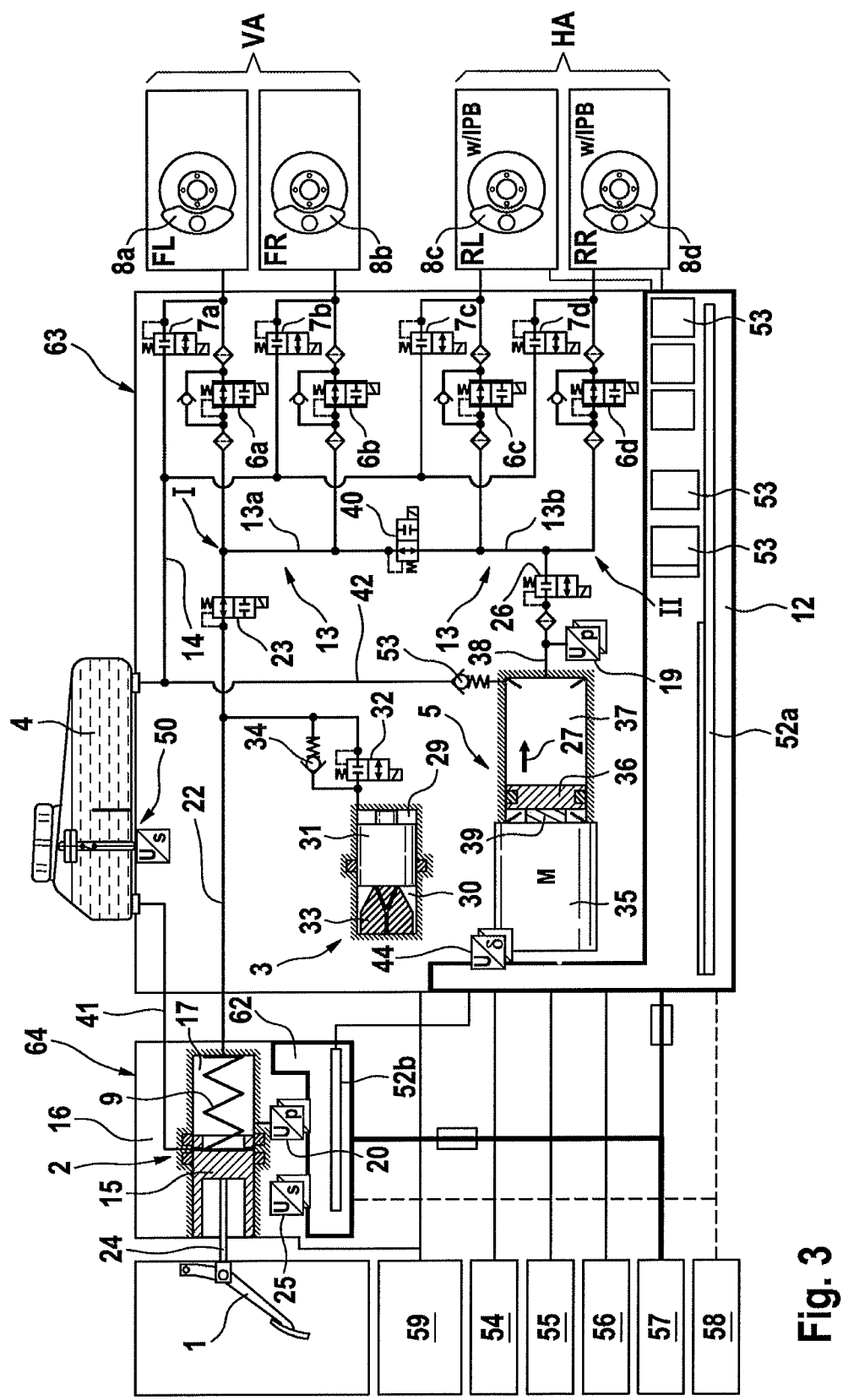

FIG. 3 schematically illustrates a third exemplary embodiment of a brake system according to an aspect of the invention for a motor vehicle. The brake system corresponds in terms of the individual components to the exemplary embodiment of FIG. 2.

However, the hydraulic components are arranged in two separate modules or hydraulic control and regulating units (HCU) 63 and 64. The hydraulic control and regulating unit 63 is assigned the electronic control and regulating unit (ECU) 12 having the printed circuit board 52a and designed, for example, as one unit (HECU). The hydraulic control and regulating unit 64 is assigned a second electronic control and regulating unit (ECU) 62 having a printed circuit board 52b and designed, for example, as one unit (HECU).

The two electronic control and regulating units 12 and 62 are connected to the electrical energy source 57.

The pressure medium reservoir 4 is arranged on the hydraulic control and regulating unit 63.

According to the example, the second hydraulic control and regulating unit 64 comprises the master brake cylinder 2 and the sensors 25 and 20 provided for driver braking demand detection. All the remaining hydraulic components/sensors are arranged in the first hydraulic control and regulating unit 63.

Alternatively, the second hydraulic control and regulating unit 64 can also comprise the master brake cylinder 2 and the simulation device 3 (possibly including the valves 32, 34).

Figure 4:
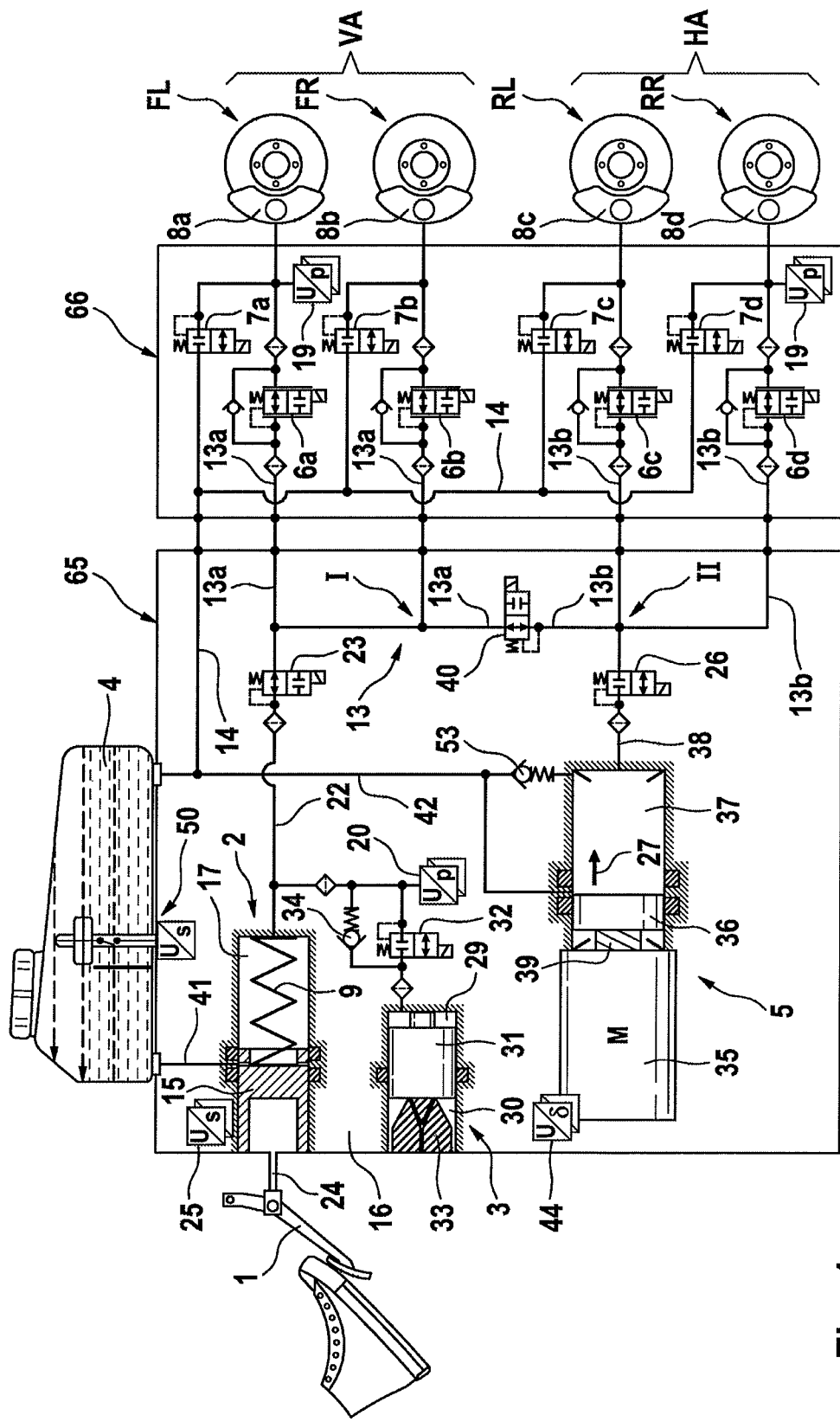

FIG. 4 schematically illustrates a fourth exemplary embodiment of a brake system according to an aspect of the invention for a motor vehicle. The brake system corresponds to the exemplary embodiment of FIG. 1, although the hydraulic components are arranged in two separate modules or hydraulic control and regulating units (HCU) 65 and 66.

The second hydraulic control and regulating unit 66 comprises the brake pressure modulation valves, according to the example the inlet valves 6a-6d and outlet valves 7a-7d. According to the example, the two wheel pressure sensors 19 are also arranged in the second hydraulic control and regulating unit 66. All the remaining hydraulic components/sensors are arranged in the first hydraulic control and regulating unit 65.

The first hydraulic control and regulating unit 65 is advantageously arranged on the firewall of the vehicle. The second hydraulic control and regulating unit 66, which is not situated on the firewall, is connected to the first hydraulic control and regulating unit 65 via hydraulic connections (parts of the lines 13a, 13b and 14).

The pressure medium reservoir 4 is arranged on the first hydraulic control and regulating unit 65.

According to the example, a method according to an aspect of the invention for operating a brake system is carried out in a brake system with at least four hydraulically actuatable wheel brakes 8a-8d for wheels FR, FL, RL, RR, which are distributed among a first vehicle axle VA and a second vehicle axle HA, with at least one electrically actuatable inlet valve 6a-6d for each wheel brake 8a-8d for the purpose of setting wheel-specific brake pressures, with a master brake cylinder 2 which can be actuated by means of a brake pedal 1 and which has a pressure chamber 17, wherein the pressure chamber 17 is separably hydraulically connected via an isolation valve 23 to a brake supply line 13 to which the wheel brakes 8a-8d are connected, and with an electrically controllable pressure-providing device 5 having a pressure space 37, wherein the pressure space 37 is hydraulically connected to the brake supply line 13. Here, an electrically actuatable circuit isolation valve 40 is arranged in the brake supply line 13 in such a way that, with the circuit isolation valve 40 closed, the brake supply line 13 is hydraulically separated into a first line section 13a and a second line section 13b, wherein the first line section 13a is connected to the wheel brakes 8a, 8b, and the second line section 13b is connected to the wheel brakes 8c, 8d.

According to the method for operation, the circuit isolation valve 40 is open in a fault-free state of the brake system, and the circuit isolation valve 40 is closed upon a suspicion of a leakage in the brake system or a determination of a leakage in the brake system. For this purpose, according to the example, a signal of a measuring device 50 which detects a pressure medium level of a pressure medium reservoir 4 which is under atmospheric pressure is evaluated. The pressure isolation valve 40 is closed in dependence on the pressure medium level of the pressure medium reservoir 4, that is to say the brake system is divided into two brake circuits.

According to the example, with the circuit isolation valve 40 closed, the wheel brakes 8c, 8d assigned to the second line section 13b are actuated by means of the pressure-providing device 5, and the wheel brakes 8a, 8b assigned to the first line section 13a are actuated by means of the master brake cylinder 2.

Advantageously, with the circuit isolation valve 40 closed, the wheel brakes 8c, 8d of the rear axle HA are actuated by means of the pressure-providing device, whereas the wheel brakes 8a, 8b of the front axle VA are actuated by means of the master brake cylinder 2.

The method is preferably carried out in a brake system according to an aspect of the invention, for example in one of the exemplary brake systems of FIGS. 1 to 3.

A separation into two brake circuits, which is relevant for example for the case of a leakage in the brake system, in order to continue to be able to use at least one of the brake circuits for braking is realized in brake systems known from the prior art by the floating piston of a tandem master brake cylinder.

In the case of the exemplary brake systems, the master brake cylinder 2 is of single-circuit design, with the result that it can be connected to the brake supply line 13 (that is to say to all of the inlet valves 6a-6d) by means of only a single isolation valve 23 or can be disconnected from the brake supply line 13.

Furthermore, according to the example, the pressure-providing device 5 is of single-circuit design and can be connected to the brake supply line 13 (that is to say to all of the inlet valves 6a-6d) by means of only a single sequence valve 26 or can be disconnected from the brake supply line 13.

Furthermore, a normally open circuit isolation valve 40 is provided in the brake supply line 13 that allows the brakes system to be separated into two brake circuits I, II in a situation-adapted and temporary manner.

One advantage of an aspect of the invention is that a circuit separation can be activated in a situation-dependent manner. A further advantage is that here the pressure-providing device 5 does not have to be deactivated.

Furthermore, it is considered to be particularly advantageous that, after the circuit separation, the master brake cylinder 2 is connected to the front axle wheel brakes 8a, 8b, and the pressure-providing device 5 is connected to the rear axle wheel brakes 8c, 8d, since this means that a complete ABS (antilocking control) can still be regulated on the rear axle HA or that there can be regulation of an EBD (Electronic Brake Force Distribution—also known as EBV from the German acronym: EBV automatically regulates the brake pressure on the rear axle wheel brakes and keeps the vehicle stable under optimum braking of the rear axle). This additionally affords a design advantage for the hydraulic fallback level after power failure to the effect that a design for about 4 m/s$^2$ can be aimed for in order, in the case of all fault patterns, in particular wheel leakages, at least to guarantee the legally required residual braking action of 2.44 m/s$^2$.

The invention claimed is:

1. A brake system for a motor vehicle having at least four hydraulically actuatable wheel brakes for wheels, which are distributed among a first vehicle axle and a second vehicle axle, comprising:
   an electrically actuatable inlet valve for each wheel brake for the purpose of setting wheel-specific brake pressures,
   a master brake cylinder which can be actuated by a brake pedal and which is separably hydraulically connected via an isolation valve to a brake supply line to which the inlet valves are connected, and
   an electrically controllable pressure-providing device having a pressure space, wherein the pressure space is hydraulically connected to the brake supply line,
   wherein an electrically actuatable circuit isolation valve is arranged in the brake supply line in such a way that, with the circuit isolation valve closed, the brake supply line is hydraulically separated into a first line section and a second line section, wherein the first line section is connected to two of the inlet valves, and the second line section is connected to the remaining inlet valves, and wherein the pressure space of the pressure-providing device is hydraulically connected to the second line section,
   wherein the master brake cylinder is of single-circuit design with only one pressure chamber, and the circuit isolation valve is of normally open design, wherein the pressure chamber of the master brake cylinder is connected to the first line section via the isolation valve.

2. The brake system as claimed in claim 1, wherein the pressure space of the pressure-providing device is separably connected to the brake supply line via a sequence valve.

3. The brake system as claimed in claim 1, wherein the inlet valves connected to the first line section are assigned to the wheels of the first vehicle axle, and the inlet valves connected to the second line section are assigned to the wheels of the second vehicle axle.

4. The brake system as claimed in claim 3, wherein the first vehicle axle is the front axle, and the second vehicle axle is the rear axle.

5. The brake system as claimed in claim 1, wherein the isolation valve is of normally open design, and the sequence valve is of normally closed design.

6. The brake system as claimed in claim 1, further comprising a pressure medium reservoir which is under atmospheric pressure and whose pressure medium level is detected by a measuring device.

7. The brake system as claimed in claim 6, wherein the pressure chamber of the master brake cylinder is connected to the pressure medium reservoir via a hydraulic connection, wherein no electrically actuatable valve is arranged in the hydraulic connection.

8. A method for operating a brake system as claimed in claim 1, the method comprising:
opening the circuit isolation valve in a fault-free state of the brake system; and
closing the circuit isolation valve upon a suspicion of a leakage or a determination of a leakage in the brake system.

9. A method for operating a brake system comprising:
at least four hydraulically actuatable wheel brakes for wheels which are distributed among a first vehicle axle and a second vehicle axle,
at least one electrically actuatable inlet valve (6a-6d) for each wheel brake for the purpose of setting wheel-specific brake pressures,
a master brake cylinder which can be actuated by a brake pedal and which has a pressure chamber, wherein the pressure chamber is separably hydraulically connected via an isolation valve to a brake supply line to which the wheel brakes are connected, and
an electrically controllable pressure-providing device having a pressure space, wherein the pressure space is hydraulically connected to the brake supply line,
wherein an electrically actuatable circuit isolation valve is arranged in the brake supply line in such a way that, with the circuit isolation valve closed, the brake supply line is hydraulically separated into a first line section and a second line section, wherein the circuit isolation valve is of normally open design, and wherein the first line section is connected to two of the wheel brakes, and the second line section is connected to the other wheel brakes,
the method comprising:
opening the circuit isolation valve in a fault-free state of the brake system, and
closing the circuit isolation valve upon a suspicion of a leakage or a determination of a leakage in the brake system,
wherein the circuit isolation valve is closed in dependence on a pressure medium level of a pressure medium reservoir.

10. The method as claimed in claim 8, wherein the circuit isolation valve is closed in dependence on a pressure medium level of a pressure medium reservoir.

11. The method as claimed in claim 8, wherein, to monitor the brake system for a leakage, a signal of a measuring device which detects a pressure medium level of a pressure medium reservoir which is under atmospheric pressure is evaluated.

12. The method as claimed in claim 8, wherein, with the circuit isolation valve closed, the wheel brakes assigned to the second line section are actuated by the pressure-providing device.

13. The method as claimed in claim 8, wherein, with the circuit isolation valve closed, the wheel brakes of the second vehicle axle are actuated by the pressure-providing device.

14. The method as claimed in claim 8, wherein, with the circuit isolation valve closed, the wheel brakes assigned to the first line section are actuated by the master brake cylinder.

15. The method as claimed in claim 8, wherein, with the circuit isolation valve closed, the wheel brakes of the first vehicle axle are actuated by the master brake cylinder.

16. The brake system as claimed in claim 2, wherein the inlet valves connected to the first line section are assigned to the wheels of the first vehicle axle, and the inlet valves connected to the second line section are assigned to the wheels of the second vehicle axle.

17. The method as claimed in claim 13, wherein, the second vehicle axle is a rear axle.

18. The method as claimed in claim 15, wherein, the first vehicle axle is a front axle.

* * * * *